(12) United States Patent
Buskey et al.

(10) Patent No.: US 7,512,795 B2
(45) Date of Patent: Mar. 31, 2009

(54) METHOD AND APPARATUS FOR AUTHENTICATING COMPONENTS

(75) Inventors: Ronald F. Buskey, Loves Park, IL (US); Larry C. Puhl, Huntley, IL (US); Duane C. Rabe, Hawthorn Woods, IL (US)

(73) Assignee: Motorola, Inc., Schaumburg, IL (US)

(*) Notice: Subject to any disclaimer, the term of this patent is extended or adjusted under 35 U.S.C. 154(b) by 794 days.

(21) Appl. No.: 11/028,872

(22) Filed: Jan. 4, 2005

(65) Prior Publication Data

US 2006/0149966 A1 Jul. 6, 2006

(51) Int. Cl.
*G06F 21/00* (2006.01)
(52) U.S. Cl. .......................................... 713/168; 726/27
(58) Field of Classification Search ................ 713/168, 713/150, 153, 171–173, 189–193; 380/255, 380/259–262; 726/26–30, 34–35
See application file for complete search history.

(56) References Cited

U.S. PATENT DOCUMENTS

| 6,233,291 | B1* | 5/2001 | Shukhman et al. | 375/341 |
| 6,377,691 | B1* | 4/2002 | Swift et al. | 380/277 |
| 7,123,719 | B2* | 10/2006 | Sowa et al. | 380/247 |
| 7,149,899 | B2* | 12/2006 | Pinkas et al. | 713/182 |
| 2003/0105959 | A1* | 6/2003 | Matyas et al. | 713/168 |
| 2003/0204743 | A1 | 10/2003 | Devadas et al. | |
| 2004/0098583 | A1* | 5/2004 | Weber | 713/168 |
| 2004/0180673 | A1* | 9/2004 | Adams et al. | 455/456.2 |

OTHER PUBLICATIONS

Jussipekka Leiwo, "Cryptographic Protocols", Jun. 16, 2003, 9 pages.
Juan Soto; "Key Management Workshop"; Nov. 1-2, 2001; 30 pages.

* cited by examiner

*Primary Examiner*—Gilberto Barron, Jr.
*Assistant Examiner*—Hadi Armouche
(74) *Attorney, Agent, or Firm*—Sylvia Chen; Ingrassia, Fisher & Lorenz, P.C.

(57) ABSTRACT

A method and apparatus authenticates a component (450) for use in a device (100). The device memory (122) stores a predetermined challenge and a predetermined response (212) associated with the predetermined challenge. The method detects whether the component has been coupled to the device. If the component has been detected (206), the predetermined challenge is provided to the component (208). If a component response is received within a predetermined response time (210), it is compared to the predetermined response. The component is disabled (214) if either the component response is not received within the predetermined response time or the component response is received within the predetermined response time but the component response is not equivalent to the predetermined response. The component is enabled (216) if the component response is received within the predetermined response time and the component response is equivalent to the predetermined response.

18 Claims, 5 Drawing Sheets

METHOD AND APPARATUS FOR AUTHENTICATING COMPONENTS

FIELD OF THE INVENTION

The present invention generally relates to anti-cloning protection, and more particularly relates to authenticating legitimate components of a device prior to utilization thereof.

BACKGROUND OF THE INVENTION

One of the causes of product failure is the use of unauthorized components, such as counterfeit components, with the product. Thus, manufacturers try to prevent the use of such counterfeit components with their products. Such issues arise in many products, including electronic devices which utilize various replaceable components such as portable electronic devices which use batteries, audio devices which use headphones, and computers which interface with peripheral devices like CD readers. Also, similar issues arise in automotive electronics where cars have replaceable semiconductor devices. The manufacturer is very concerned that an inferior component may be used in its product and expose the manufacturer to liability for damage or injuries caused by such unauthorized components.

Thus, what is needed is a method and apparatus for authentication of a component before utilization of such component by the product to which it is coupled. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method and apparatus is provided for authenticating a component for use with an electronic device. The electronic device has a predetermined challenge and a predetermined response associated with the predetermined challenge stored therein. The method detects whether a component has been coupled to the device. If a component has been detected, the predetermined challenge is provided to the component. The device then determines whether a component response has been received from the component within a predetermined response time. If a component response is received within the predetermined response time, it is compared to the predetermined response. The component is disabled if either the component response is not received within the predetermined response time or the component response is not equivalent to the predetermined response. The component is enabled if the component response is received within the predetermined response time response and the component response is equivalent to the predetermined response.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
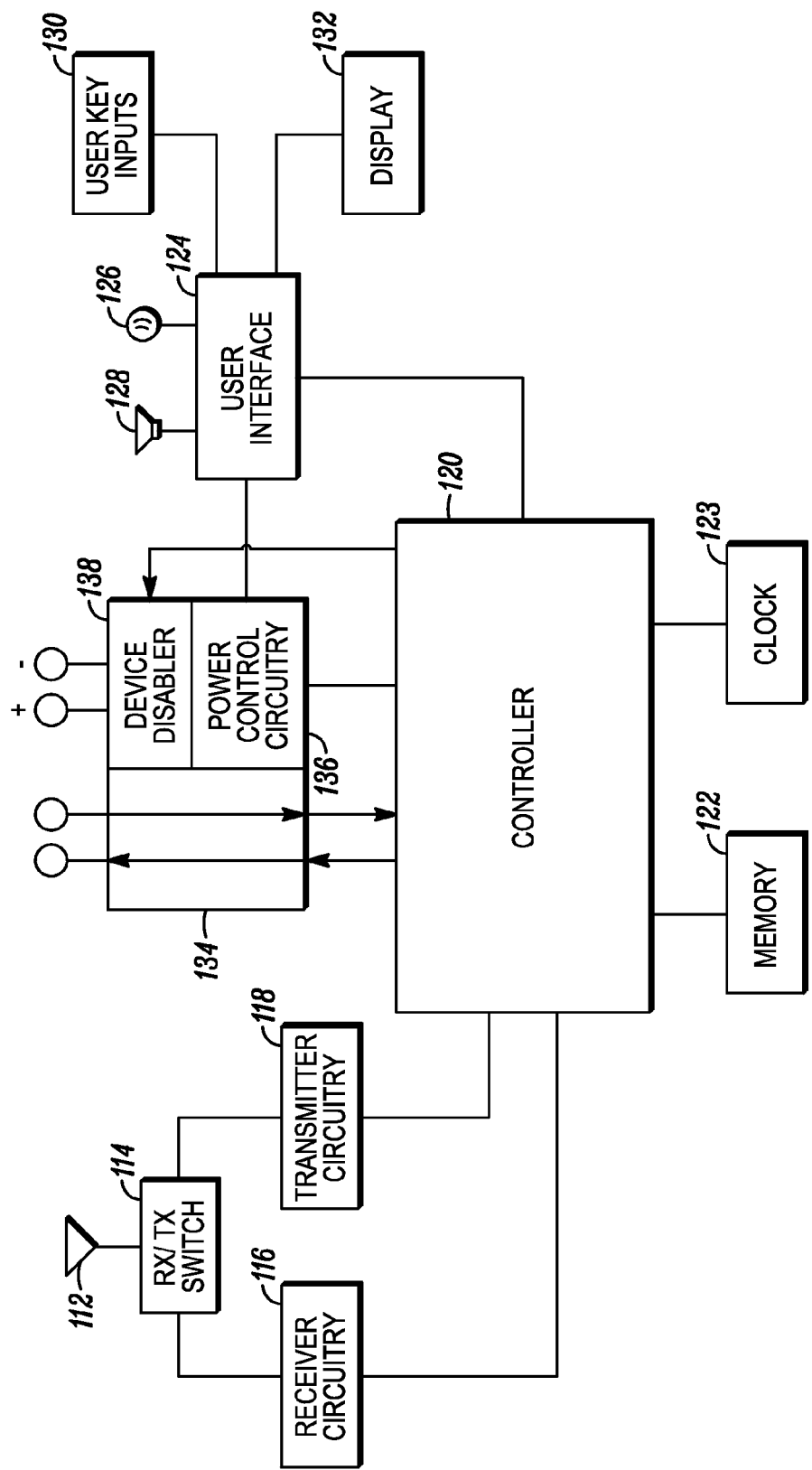
FIG. 1 is a block diagram of a portable electronic device in accordance with an embodiment.

FIG. 1 depicts a block diagram of a portable electronic device 100, such as a cellular telephone, in accordance with an embodiment. Although the portable electronic device 100 is depicted as a cellular telephone, the portable electronic device can be implemented as a pager, a portable digital assistant (PDA), a laptop computer, an audio device such as a compact disc player, an automobile electronic system, or the like. The portable electronic device 100 includes an antenna 112 for receiving and transmitting radio frequency (RF) signals. A receive/transmit switch 114 selectively couples the antenna 112 to receiver circuitry 116 and transmitter circuitry 118 in a manner familiar to those skilled in the art. The receiver circuitry 116 demodulates and decodes the RF signals to derive information and is coupled to a controller 120 for providing the decoded information thereto for utilization thereby in accordance with the function(s) of the cellular telephone.

The controller 120 also provides information to the transmitter circuitry 118 for encoding and modulating information into RF signals for transmission from the antenna 112. The controller 120 is coupled to a nonvolatile memory device 122 for storing information therein and for retrieving information therefrom. In accordance with the embodiment, the nonvolatile memory device 122 stores a plurality of predetermined challenges and a plurality of predetermined responses, each of the plurality of predetermined challenges associated with at least one of the plurality of predetermined responses. For example, twelve challenges and twelve responses could be stored in the memory device 122.

Alternatively, there could be multiple responses associated with each challenge, thereby accommodating a unique response per challenge for each authorized battery supplier. For example, twelve challenges and thirty-six responses could be stored in the memory device 122.

The controller 120 is also coupled to a clock 123 for receiving a clock signal therefrom and coupled to a user interface 124 to perform the functions of the portable electronic device 100. The user interface 124 includes a microphone 126, a speaker 128, one or more key inputs 130, including a keypad, and a display 132 which displays information to a user and may also include accept touch screen inputs.

A component coupler 134 electrically and physically couples a component to the electronic device 100. In this embodiment, the component is a battery, but the component could also be implemented as headphones, computer peripherals, replacement semiconductor devices, or other electronic device components. The battery component coupler 134 includes power control circuitry 136 which is coupled to the components of the portable electronic device 100, such as the controller 120, the receiver circuitry 116, the transmitter circuitry 118 and/or the user interface 124, to provide appropriate operational voltage and current to those components. A device disabler 138 is coupled to the controller 120 for selectively coupling the battery to the power control circuitry 136 for enabling operation of the portable electronic device 100 or uncoupling the or uncoupling the battery from the power control circuitry 136 for disabling operation of the portable electronic device 100.

Figure 2:
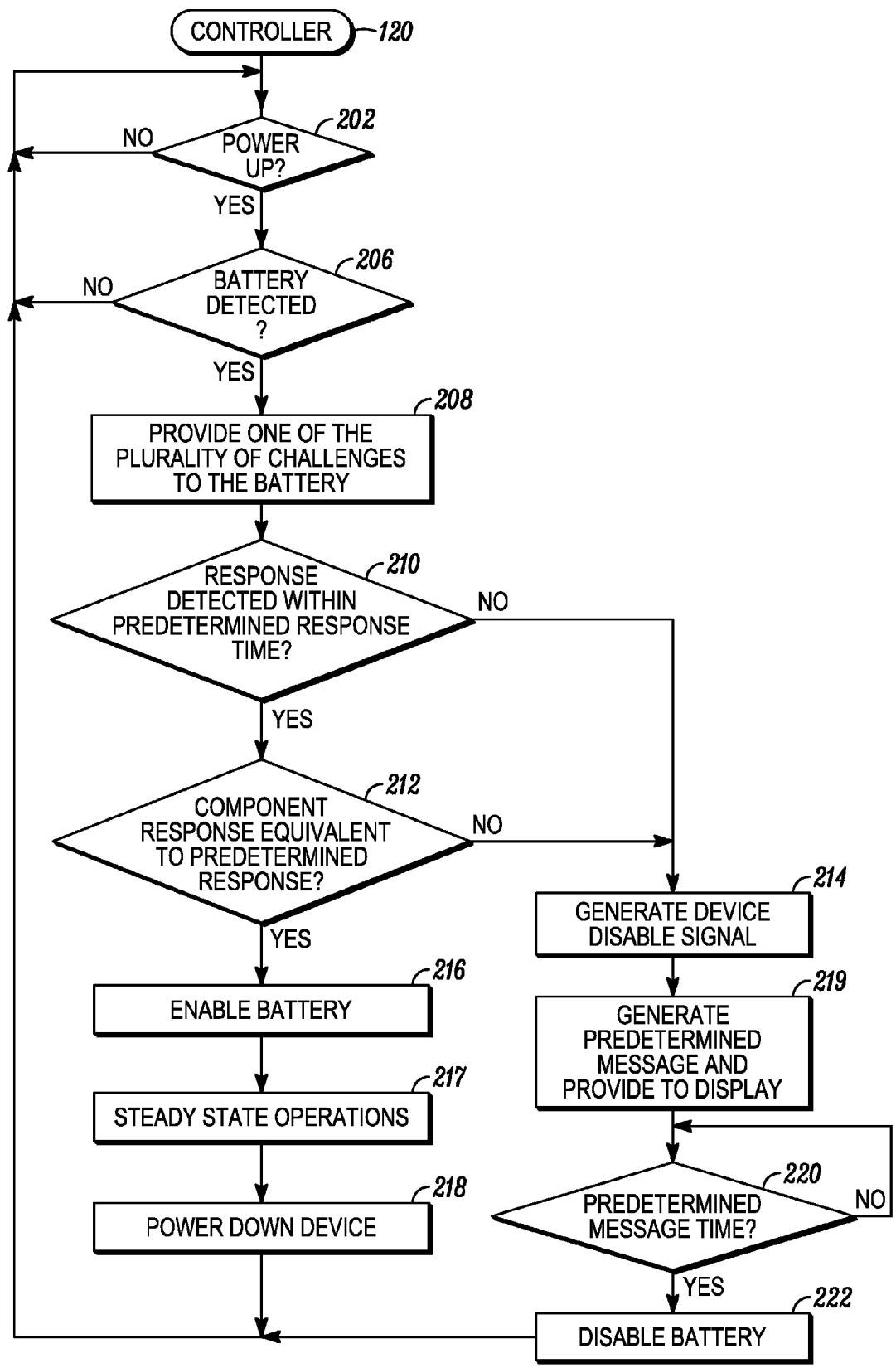
FIG. 2 is a flow diagram of the operation of the controller of the portable electronic device in accordance with the embodiment.

In accordance with FIG. 2, the controller 120 of the portable electronic device 100 determines whether a power up input is received 202 from the user key inputs 130. While the controller 120 of the portable electronic device 100 determines initially whether a power up input is received 202, in other implementations the triggering event for authenticating a component could be detection of coupling of the component to the electronic device, such as coupling headphones to an audio electronic device, or activating the ignition of a car. In addition, the controller 120 is coupled to the component coupler 134 and the nonvolatile memory device 122 for detecting 206 whether a component has been coupled to the device. If the portable electronic device 100 is powered up 202 and a component has been detected 206, one of the plurality of predetermined challenges is provided 208 to the battery through the component coupler 134. The controller 120 is also coupled to the clock 123 for determining whether a component response has been received from the battery within a predetermined response time 210. The predetermined response time is selected by the system designer to be a time greater than an authorized component can respond but less than the time an unauthorized or cloned device could respond. For example, where the component uses a hard-wired implementation of a cryptographic function, the predetermined response time is chosen to be greater than the response time of the hard-wired implementation (generally based on the on-chip oscillator's largest variance), but much less than the shortest response time of a microprocessor implementation of a cryptographic function, which is often five to ten times the response time of the hard-wired implementation.

The controller 120 compares the component response to ones of the plurality of predetermined responses associated with the one of the plurality of predetermined challenges provided to the component 212. If a component response is not received within the predetermined response time 210 or if a component response is received within the predetermined response time 210 but is not equivalent to ones of the plurality of predetermined responses 212, the controller 120 generates a device disabling signal 214 and provides it to the device disabler 138. Otherwise, if the component response is received within the predetermined response time 210 and is equivalent to one of the plurality of predetermined responses associated with the one of the plurality of challenges provided to the battery 212, the controller 120 enables operation 216 of the component. The component then performs its normal steady state operations 217 until power down 218 after which operation returns to await the next power up input 202.

When the device disabling signal is generated 214, the controller 120 enables operation of the portable electronic device 100 and provides a message such as "UNAUTHORIZED BATTERY" to the display 132 for display thereon 219. This message is provided to the display for a predetermined message time 220 after which the device disabling signal 222 is provided to the device disabler 138 to prevent operation of the component.

Figure 3:
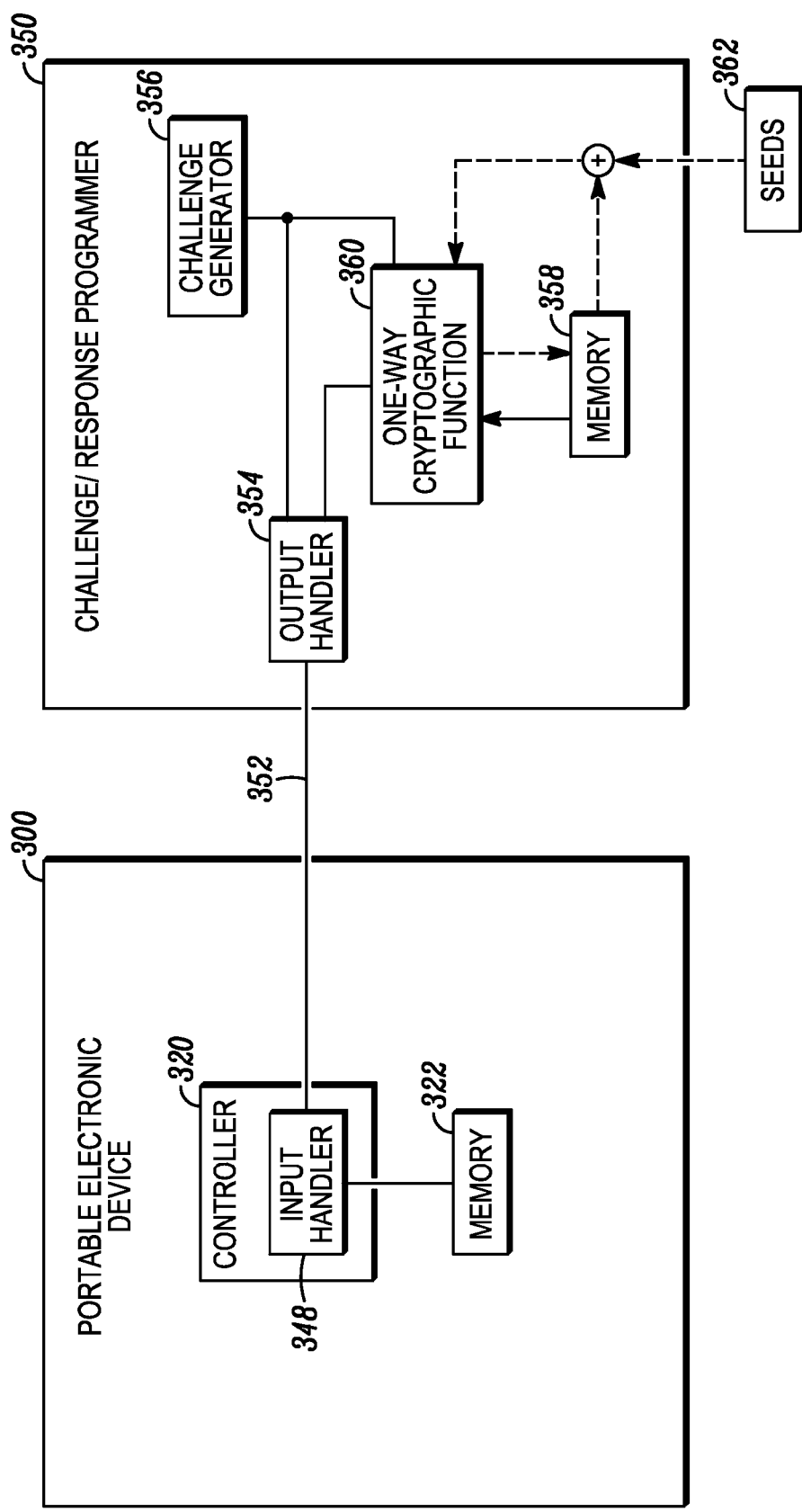
FIG. 3 is a block diagram of the portable electronic device and the challenge/response programmer in accordance with the embodiment.

Referring to FIG. 3, the portable electronic device 300 is coupleable to a challenge/response generator 350 for generating predetermined challenges and predetermined responses and storing them in the memory 322 of the portable electronic device 300. In order to protect the security of the methodology of the embodiment, the challenge/response generator 350 is located in a secure storage vault at an authorized manufacturing facility, distribution facility, or test and programming facility for the portable electronic devices 300. A communication link 352 couples an output handler 354 of the challenge/response generator 350 to an input handler 348 of the portable electronic device 300. This link can be established during the configuration stage of final manufacturing of the portable electronic device 300 or during testing of the portable electronic device 300. In addition, the link could be re-established as an over-the-air link to re-program the predetermined challenges and predetermined responses stored in the memory 322 of the portable electronic device 300 in response to cloning or counterfeiting of devices, unauthorized duplication of the predetermined challenges and predetermined responses, or some other breach of the security of the system.

To generate the predetermined challenges and predetermined responses, a challenge generator 356 randomly generates predetermined challenges and provides them to the output handler 354 for storage in the memory 322 by the controller 320. The predetermined response is generated by processing the predetermined challenge and secret information stored in a nonvolatile memory 358 in a predetermined manner through a predetermined hard-wired implementation of a one-way cryptographic function 360. The generated predetermined response is provided to the output handler for storage in the memory 322. A set of predetermined challenges and predetermined responses could be generated by the challenge/response generator 350 and batch loaded to a plurality of portable electronic devices 300, however better security is maintained by varying the set of predetermined challenges and predetermined responses at least weekly.

The secret information is derived from seeds 362 which are coupled to the challenge/response generator 350 in a very secure facility for a one-time programming of the memory 358. In this manner, there are no seeds stored in the portable electronic device 300 or in the challenge/response generator 350. When the seeds 362 are coupled to the challenge/response generator 350, the secret information is derived by layering the seeds 362. In the embodiment, the secret information is derived through a three-layered process in the following manner: processing a first seed 362 through the one-way cryptographic function 360 and storing the result in the memory 358, then appending or mathematically adding in binary form the information stored in the memory 358 with the second seed and processing the result through the one-way cryptographic function 360 and storing the result in the memory 358, and then appending or adding the information stored in the memory 358 with the third seed and processing the result through the one-way cryptographic function 360 and storing the result as the secret information in the memory 358.

Figure 4:
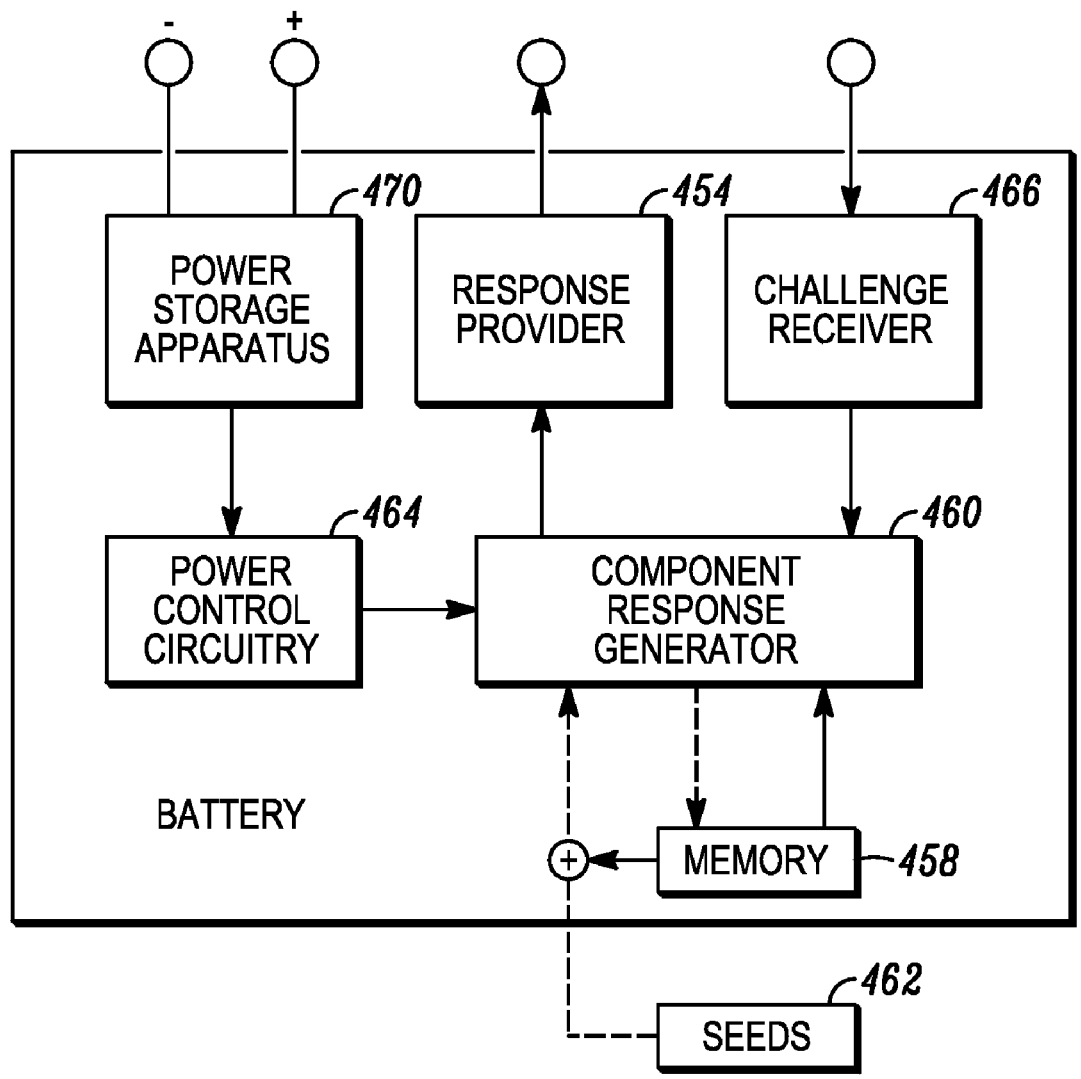
FIG. 4 is a block diagram of a battery in accordance with the embodiment.

In FIG. 4, a battery 450 includes a power storage apparatus 470 for providing power to the portable electronic device 100 (FIG. 1) when coupled thereto. The battery 450 is simply an example of a component and could alternatively be depicted as a headset, a computer peripheral, a semiconductor component or any other component. Power control circuitry 464 is also coupled to the power storage apparatus 462 for providing power to the battery for operation in accordance with the embodiment. A challenge receiver 466 couples to the portable electronic device 100 for receiving one of a plurality of predetermined challenges therefrom. The challenge receiver 466 and a nonvolatile memory 458 having secret information stored therein are coupled to a component response generator 460 which generates a component response for providing to the portable electronic device 100 via a response provider 454. The component response generator 460 is a hard-wired implementation of a one-way cryptographic function having a predetermined processing time that is less than a predetermined response time 210 (FIG. 2) utilized by the portable electronic device 100. The secret information stored in the memory 458 is derived from layering seeds 462 (in the embodiment layering three seeds) which are coupled to the battery 450. At the manufacturing location of the integrated circuit that includes the component response generator 460 and the memory 458, a first seed 462 is processed through the one-way cryptographic function of the component response generator 460 and the result is stored in the memory 458. At the battery house where the battery 450 is assembled, the information stored in the memory 458 is appended or mathematically added in binary form to a second seed and the result is processed through the one-way cryptographic function of the component response generator 460 and the result is stored in the memory 458. When the battery is delivered to a distribution center for the electronic device, the information stored in the memory 458 is appended or added with a third seed and the result is processed through the component response generator 460 and the three-layered seeded result is stored as the secret information in the memory 458. In this manner, none of the semiconductor manufacturer, the battery house, or the distributor has the full information to derive the secret information stored in the memory 458. While coupling the seeds 462 and appending or adding the seeds 462 and the information stored in the memory 458 has been shown as a process performed outside the component response generator 460, this processing could be accommodated within the component response generator 460, particularly during the third layer seed 462 processing. In addition, coupling the third layer seed 462 could be through the input to the challenge receiver 466 to utilize the inputs on the battery 450 for layering the seeds 462.

Figure 5:
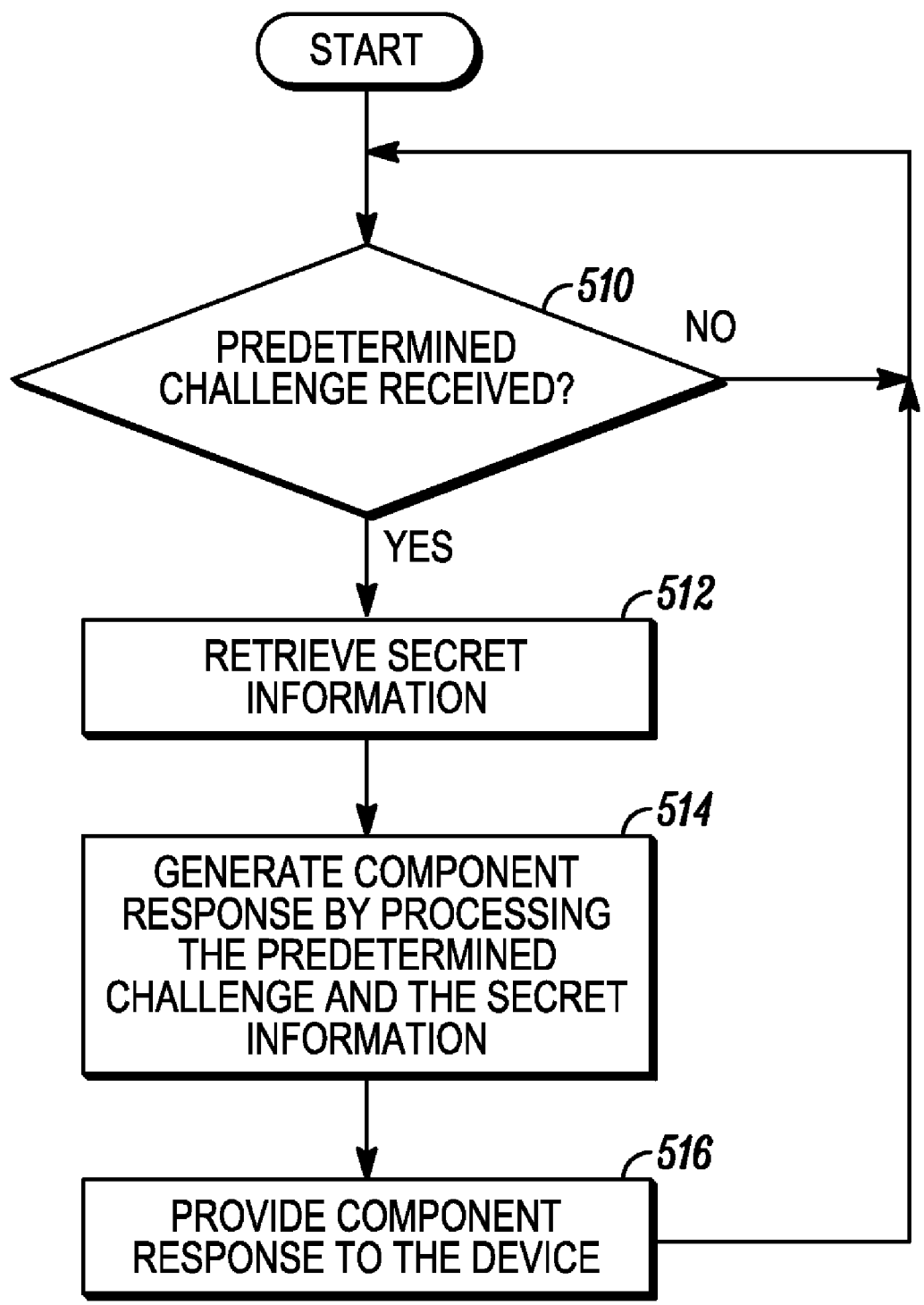
FIG. 5 is a flow diagram of the operation of the component response generator of the portable electronic device in accordance with the embodiment.

Referring to FIG. 5, when the challenge receiver 466 receives a predetermined challenge 510, the secret information is retrieved 512 from the memory 458. The component response generator 460 generates a component response by processing the predetermined challenge and the secret information through the one-way cryptographic function 514. The component response is provided to the device 516 by the response provided 454.

In a like manner to the challenge/response generator 350 (FIG. 3), the secret information stored in the memory 458 of the battery 450 is derived from a seed which is coupled to the battery 450 in a secure facility, such as the authorized battery manufacturer, for a one-time programming of the memory 458. Since the component response generator 460 is a hard-wired implementation of a one-way cryptographic function, the seed cannot be derived from the secret information. Also, as mentioned above, each battery manufacturer could be provided a separate seed and therefore, a predetermined challenge would have a unique predetermined response for each battery manufacturer.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for authenticating a component for use with a device having a predetermined challenge and a predetermined response associated with the predetermined challenge stored in the device, the method comprising the steps of:
    detecting whether the component has been coupled to the device;
    if the component has been detected, providing the predetermined challenge to the component;
    the component receiving the predetermined challenge;
    generating a component response in response to secret information stored in the component and a one-way cryptographic function, the secret information being generated through processing a first seed of a plurality of seeds through the one-way cryptographic function to derive a first result, then processing the first result added to a second seed of the plurality of seeds through the one-way cryptographic function to derive a second result, then processing the second result added to a third seed of the plurality of seeds through the one-way cryptographic function to derive the secret information;
    providing the component response to the device;
    determining whether the component response has been received from the component within a predetermined response time;
    if the component response is received within the predetermined response time, comparing the component response to the predetermined response;
    disabling the component in response to one of the component response not being received within the predetermined response time and the component response not being equivalent to the predetermined response; and
    enabling the component if the component response is received within the predetermined response time and the component response is equivalent to the predetermined response.

2. The method of claim 1 wherein the predetermined function is a one-way cryptographic function.

3. The method of claim 2 wherein the one-way cryptographic function is a hard-wired implementation of the one-way cryptographic function having a predetermined processing time less than the predetermined response time.

4. The method of claim 3 wherein the predetermined response time is less than a processing time of a microprocessor implementation of the one-way cryptographic function.

5. The method of claim 1 wherein the step of generating the component response comprises the step of generating the component response in response to the predetermined challenge, the secret information stored in the component and the predetermined function.

6. The method of claim 5 wherein the predetermined function is a one-way cryptographic function and wherein the step of generating the component response comprises the step of generating the component response by processing the predetermined challenge and the secret information through the one-way cryptographic function.

7. The method of claim 1 wherein the step of detecting whether the component has been coupled to the device comprises the step of detecting whether the component is coupled to the device when the device is powered up.

8. The method of claim 7 wherein the device includes a user output device and wherein the step of disabling the component comprises the steps of:
    powering up the device;
    providing a message to a user of the device for a predetermined message time through the user output device, wherein the message indicates to the user that the component is an unauthorized component; and powering down the device.

9. The method of claim 1 wherein the device has a plurality of predetermined responses associated with the predetermined challenge stored therein and wherein the step of comparing the component response to the predetermined response comprises the step of comparing the component response to each of the plurality of predetermined responses, and wherein the step of disabling the component comprises the step of disabling the component in response to one of the component response not being received within the predetermined response time and the component response not being equivalent to any of the plurality of predetermined responses, and wherein the step of enabling the component comprises the step of enabling the component if the component response is received within the predetermined response time and the component response is equivalent to one of the plurality of predetermined responses.

10. A device comprising:
   a component coupler for electrically and physically coupling a component to the device;
   a memory for storing at least one predetermined challenge and at least one associated predetermined response generated in response to the at least one predetermined challenge and secret information, the secret information generated by processing a first seed of a plurality of seeds through a one-way cryptographic function to derive a first result, then processing the first result added to a second seed of the plurality of seeds through the one-way cryptographic function to derive a second result, then processing the second result added to a third seed of the plurality of seeds through the one-way cryptographic function to derive the secret information;
   a clock for generating a clock signal;
   a controller coupled to the component coupler and the memory for detecting whether the component has been coupled to the device, and, if the component has been detected, providing one of the at least one predetermined challenge to the component, the controller further coupled to the component coupler and the clock for determining in response to the clock signal whether a component response has been received from the component within a predetermined response time, wherein the controller further compares the component response to the at least one associated predetermined response if the component response is received within the predetermined response time, and wherein the controller generates a device disabling signal in response to one of the component response not being received within the predetermined response time and the component response not being equivalent to the at least one associated predetermined response; and
   a device disabler coupled to the controller for disabling the device in response to the device disabling signal.

11. The device of claim 10 further comprising user inputs for receiving operational inputs including a power on input from a user and for generating a user signal in response thereto, and wherein the component coupler generates a component signal in response to a component being coupled thereto, the controller coupled to the user inputs and the component coupler for detecting a component in response to the user signal and the component signal.

12. The device of claim 10 further comprising a user output device coupled to the controller for providing a predetermined unauthorized component message to a user in response to the device disabling signal, and wherein the controller provides the device disabling signal to the user output device for a predetermined message time and then provides the device disabling signal to the device disabler.

13. A component for physically and electrically coupling to a device, the component comprising:
   a challenge receiver for coupling to the device and receiving one of a plurality of predetermined challenges from the device;
   a component memory for storing secret information therein, the secret information being generated by processing a first seed of a plurality of seeds through a one-way cryptographic function to derive a first result, then processing the first result added to a second seed of the plurality of seeds through the one-way cryptographic function to derive a second result, then processing the second result added to a third seed of the plurality of seeds through the one-way cryptographic function to derive the secret information;
   a component response generator coupled to the challenge receiver and the component memory for generating a component response by processing one of the plurality of predetermined challenges and the secret information through a one-way cryptographic function; and
   a response provider for coupling to the device and providing the component response thereto.

14. The component of claim 13 wherein the one-way cryptographic function is a hard-wired implementation of the one-way cryptographic function having a predetermined processing time.

15. The component of claim 13 wherein the component is a battery further comprising a power storage apparatus for providing power to the component and to the device.

16. A portable electronic device comprising:
   a battery coupler for electrically and physically coupling a battery to the device;
   a nonvolatile memory for storing a plurality of predetermined challenges and a plurality of associated predetermined responses, and at least one of the plurality of associated predetermined responses generated in response to one of the plurality of predetermined challenges and secret information, the secret information generated by processing a first seed of a plurality of seeds through a one-way cryptographic function to derive a first result, then processing the first result added to a second seed of the plurality of seeds through the one-way cryptographic function to derive a second result, then processing the second result added to a third seed of the plurality of seeds through the one-way cryptographic function to derive the secret information;
   a clock for generating a clock signal;
   a controller coupled to the battery coupler and the nonvolatile memory for detecting whether the battery has been coupled to the device, and, if the battery has been detected, providing one of the plurality of predetermined challenges to the battery, the controller further coupled to the battery coupler and the clock for determining in response to the clock signal whether a component response has been received from the battery within a predetermined response time, wherein the controller further compares the component response to the plurality of associated predetermined responses if the component response is received within the predetermined response time, and wherein the controller generates a device disabling signal in response to one of the component response not being received within the predetermined response time and the component response not being equivalent to at least one of the plurality of associated predetermined responses; and a device disabler coupled to the controller for disabling the portable electronic device in response to the device disabling signal.

17. The portable electronic device of claim 16 further comprising user inputs for receiving operational inputs including a power on input from a user and for generating a user signal in response thereto, and wherein the battery coupler generates a battery coupled signal in response to a battery being coupled thereto, the controller coupled to the user inputs and the battery coupler for detecting a battery in response to the user signal and the battery coupled signal.

18. The portable electronic device of claim 16 further comprising a display coupled to the controller for providing a predetermined unauthorized battery message to a user in response to the device disabling signal, and wherein the controller provides the device disabling signal to the display for a predetermined message time and then provides the device disabling signal to the device disabler.

* * * * *